United States Patent
Tan et al.

(10) Patent No.: US 10,211,778 B2
(45) Date of Patent: Feb. 19, 2019

(54) PHOTOVOLTAIC POWER GENERATION SYSTEM AND MALFUNCTION DETECTION METHOD THEREFOR

(71) Applicants: HUBEI UNIVERSITY FOR NATIONALITIES, Hubei (CN); HUBEI YONGHENG SOLAR CO., LTD., Hubei (CN)

(72) Inventors: Jianjun Tan, Hubei (CN); Jinqiao Yi, Hubei (CN); Xianbo Sun, Hubei (CN); Yong Huang, Hubei (CN); Tao Hu, Hubei (CN); Shangyun Ding, Hubei (CN)

(73) Assignees: HUBEI UNIVERSITY FOR NATIONALITIES, Hubei (CN); HUBEI YONGHENG SOLAR CO., LTD., Hubei (CN)

( * ) Notice: Subject to any disclaimer, the term of this patent is extended or adjusted under 35 U.S.C. 154(b) by 0 days.

(21) Appl. No.: 15/547,267

(22) PCT Filed: Jan. 29, 2015

(86) PCT No.: PCT/CN2015/071848
§ 371 (c)(1),
(2) Date: Jul. 28, 2017

(87) PCT Pub. No.: WO2016/119181
PCT Pub. Date: Aug. 4, 2016

(65) Prior Publication Data
US 2018/0278206 A1   Sep. 27, 2018

(51) Int. Cl.
*H02S 50/10* (2014.01)
*H02S 10/00* (2014.01)
(Continued)

(52) U.S. Cl.
CPC ............. *H02S 50/10* (2014.12); *H02J 3/383* (2013.01); *H02J 13/00* (2013.01);
(Continued)

(58) Field of Classification Search
CPC ...... H02S 50/10; H02S 40/32; H02J 13/0017; H02J 3/383
See application file for complete search history.

(56) References Cited

U.S. PATENT DOCUMENTS

2013/0346054 A1* 12/2013 Mumtaz ................ H02J 3/383
703/13

FOREIGN PATENT DOCUMENTS

| CN | 103235221 | 8/2013 |
| CN | 103543326 | 1/2014 |

(Continued)

OTHER PUBLICATIONS

Xu, "Fault Location of Photovoltaic Array Based on Gaussian Process", Transactions of China Electrotechnical Society, Jun. 30, 2013, pp. 250, section 2, col. 28, No. 6, including an English abstract.
(Continued)

*Primary Examiner* — Toan Le
(74) *Attorney, Agent, or Firm* — Greenblum & Bernstein, P.L.C.

(57) ABSTRACT

A photovoltaic power generation system includes at least one photovoltaic power generation microgrid and a central server configured to communicate with the photovoltaic power generation microgrid via Internet. The photovoltaic power generation microgrid includes a plurality of photovoltaic power generation nodes, each of the photovoltaic power generation nodes including a photovoltaic power generation module, a sensor module configured to collect a status parameter of the photovoltaic power generation node,
(Continued)

and a wireless communication module configured to wireless transmit the status parameter of the photovoltaic power generation node; and a microgrid local server configured to receive the status parameter of each of the photovoltaic power generation nodes, determine, based on the received status parameter of the photovoltaic power generation nodes, an operating status of each of the photovoltaic power generation nodes, and transmit the received status parameter and the determined operating status to the central server through the Internet.

7 Claims, 7 Drawing Sheets

(51) Int. Cl.
*H02S 50/00* (2014.01)
*H02J 13/00* (2006.01)
*H02J 3/38* (2006.01)
*H02S 40/32* (2014.01)

(52) U.S. Cl.
CPC .......... *H02J 13/0017* (2013.01); *H02S 10/00* (2013.01); *H02S 50/00* (2013.01); *H02S 40/32* (2014.12); *Y02E 10/563* (2013.01)

(56) References Cited

FOREIGN PATENT DOCUMENTS

| CN | 104009544 | 8/2014 |
|---|---|---|
| CN | 104199394 | 12/2014 |
| CN | 104601086 | 5/2015 |

OTHER PUBLICATIONS

Search Report issued in International Patent Application No. PCT/CN2015/071848, dated Jul. 3, 2015.
Office Action issued in China Patent Appl. No. 201580000023.5, dated Jul. 5, 2016 , along with an English translation thereof.
Decision to Grant Patent issued in China Patent Appl. No. 201580000023.5, dated Nov. 15, 2016 , along with an English translation thereof.

* cited by examiner

PHOTOVOLTAIC POWER GENERATION SYSTEM AND MALFUNCTION DETECTION METHOD THEREFOR

TECHNICAL FIELD

The present disclosure relates to photovoltaic power generation, specifically, a photovoltaic power generation system and a malfunction detection method therefor.

RELATED ART

Solar energy may be converted into electrical power by a photovoltaic power generation module for storage and use, and is considered as one of the most promising new energies.

The existing photovoltaic power generation system mainly includes photovoltaic power generation module array, a combiner and an inverter. Generally, the electrical power output by the photovoltaic module array connected in series or in parallel is, after being consolidated by the combiner, converted to AC power by the inverter, so as to supply power for the load in a particular region or be directly incorporated into the power grid.

However, the low efficiency of photovoltaic power generation system becomes a bottle neck for the application and dissemination of photovoltaic power generation system. The main reason is that the converting efficiency of monocrystalline silicon cell developed in the current laboratory is no more than 25.0%, the converting efficiency of multicrystalline silicon cell is no more than 20.4%, and the overall efficiency of monocrystalline silicon photovoltaic power generation module is no more than 21%, which makes the efficiency of the whole photovoltaic power generation system to be lower. In other words, it is difficult to improve the current photovoltaic converting efficiency. Therefore, it is necessary to research and develop a different way to effectively improve the overall efficiency of the photovoltaic power generation system.

SUMMARY

Technical Problem

In view of the above, the present disclosure addresses the technical problem of how to improve the efficiency of photovoltaic power generation system, so as to reduce the cost of power generation.

Technical Solution

In order to solve the above technical problem, the present disclosure provides a photovoltaic power generation system, comprising at least one photovoltaic power generation microgrid and a central server configured to communicate with the photovoltaic power generation microgrid via Internet, the photovoltaic power generation microgrid comprising:

a plurality of photovoltaic power generation nodes, each comprising a photovoltaic power generation module, a sensor module configured to collect a status parameter of the photovoltaic power generation node, and a wireless communication module configured to wirelessly transmit the status parameter of the photovoltaic power generation node; and a microgrid local server configured to receive the status parameter of each of the photovoltaic power generation nodes, determine, based on the received status parameter of each of the photovoltaic power generation nodes, an operating status of the photovoltaic power generation node, and transmit the received status parameter and the determined operating status to the central server through the Internet Regarding the above photovoltaic power generation system, in a possible implementation, there is further included a memory, wherein the memory is configured to store a physical address and an ID number of each of the photovoltaic power generation nodes in a correlated manner, and the microgrid local server is configured to, when determining that a malfunction occurs in a particular photovoltaic power generation node based on the received status parameter of the photovoltaic power generation nodes, retrieve from the memory a corresponding physical address based on the ID number of the particular photovoltaic power generation node, and transmit a message indicating that the malfunction occurs in the photovoltaic power generation node with the physical address to a particular terminal via the central server Regarding the above photovoltaic power generation system, in one possible implementation, there is further included a positioning assisting terminal, wherein the positioning assisting terminal is configured to determine a physical address at which a photovoltaic power generation node is to be installed, obtain an ID number of the photovoltaic power generation node to be installed at the physical address, and, after storing the physical address and the ID number in a correlated manner in the memory, prompt an operator to install the photovoltaic power generation node at the physical address.

Regarding the above photovoltaic power generation system, in a possible implementation, there is further provided:

at least one inverter, each comprising a DC-AC conversion module configured to convert DC power output by at least one of the photovoltaic power generation nodes into AC power, a sensor module configured to collect a status parameter of the inverter, and a wireless communication module configured to wirelessly transmit the status parameter of the inverter; and an inverter local server configured to receive the status parameter of the inverter, and transmit the received status parameter of the inverter to the central server through the Internet.

Regarding the above photovoltaic power generation system, in a possible implementation, the sensor module of the inverter comprises at least one of:

a current transformer configured to collect current parameter of the inverter;

a voltage transformer configured to collect voltage parameter of the inverter;

a temperature and humidity sensor configured to collect temperature and humidity parameters of the inverter; and a noise sensor configured to collect ambient noise parameter of the inverter.

Regarding the above photovoltaic power generation system, in a possible implementation, the sensor module in each of the photovoltaic power generation nodes comprises at least one of:

a voltage sampling circuit configured to collect voltage parameter of the photovoltaic power generation module;

a current sampling circuit configured to collect current parameter of the photovoltaic power generation module;

a temperature and humidity sensor configured to collect temperature and humidity parameters of the photovoltaic power generation module; and a light intensity sensor configured to collect light intensity parameter of the environment where the photovoltaic power generation module is installed.

In order to solve the above technical problem, the present disclosure further provides a malfunction detection method for the photovoltaic power generation system according to any one of claims 1-6, the method comprising:

determining by the microgrid local server based on the received status parameter of each of the photovoltaic power generation nodes, an operating status of the photovoltaic power generation node; and when determining that a malfunction occurs in a particular photovoltaic power generation node, retrieving by the microgrid local server based on an ID number of the particular photovoltaic power generation node, a corresponding physical address, and transmitting by the microgrid local server a message indicating that the malfunction occurs in the photovoltaic power generation node with the physical address to a particular terminal via the central server.

Regarding the above malfunction detection method, in a possible implementation, there is further comprised a step of storing a physical address and an ID number of each of the photovoltaic power generation nodes in a correlated manner.

Regarding the above malfunction detection method, in a possible implementation, the step of storing the physical address and the ID number of each of the photovoltaic power generation nodes in a correlated manner comprises:

determining a physical address at which a photovoltaic power generation node is to be installed;

obtaining an ID number of the photovoltaic power generation node to be installed at the physical address; and after the physical address and the ID number are stored in a correlated manner, prompting an operator to install the photovoltaic power generation node at the physical address.

Advantageous Effect

The photovoltaic power generation system of the embodiments of the present disclosure can, with a flexible multi-microgrid structure, acquire the status parameters of the photovoltaic power generation nodes in each microgrid, so as to precisely monitor the operating status of each photovoltaic power generation node. The data has coherent network architecture and is featured as complete, accurate, stable and credible data and with high robustness. The efficiency of the photovoltaic power generation system could be improved, thereby reducing the cost of power generation.

Additional features and aspects of the present disclosure will become apparent from the following description of exemplary examples with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
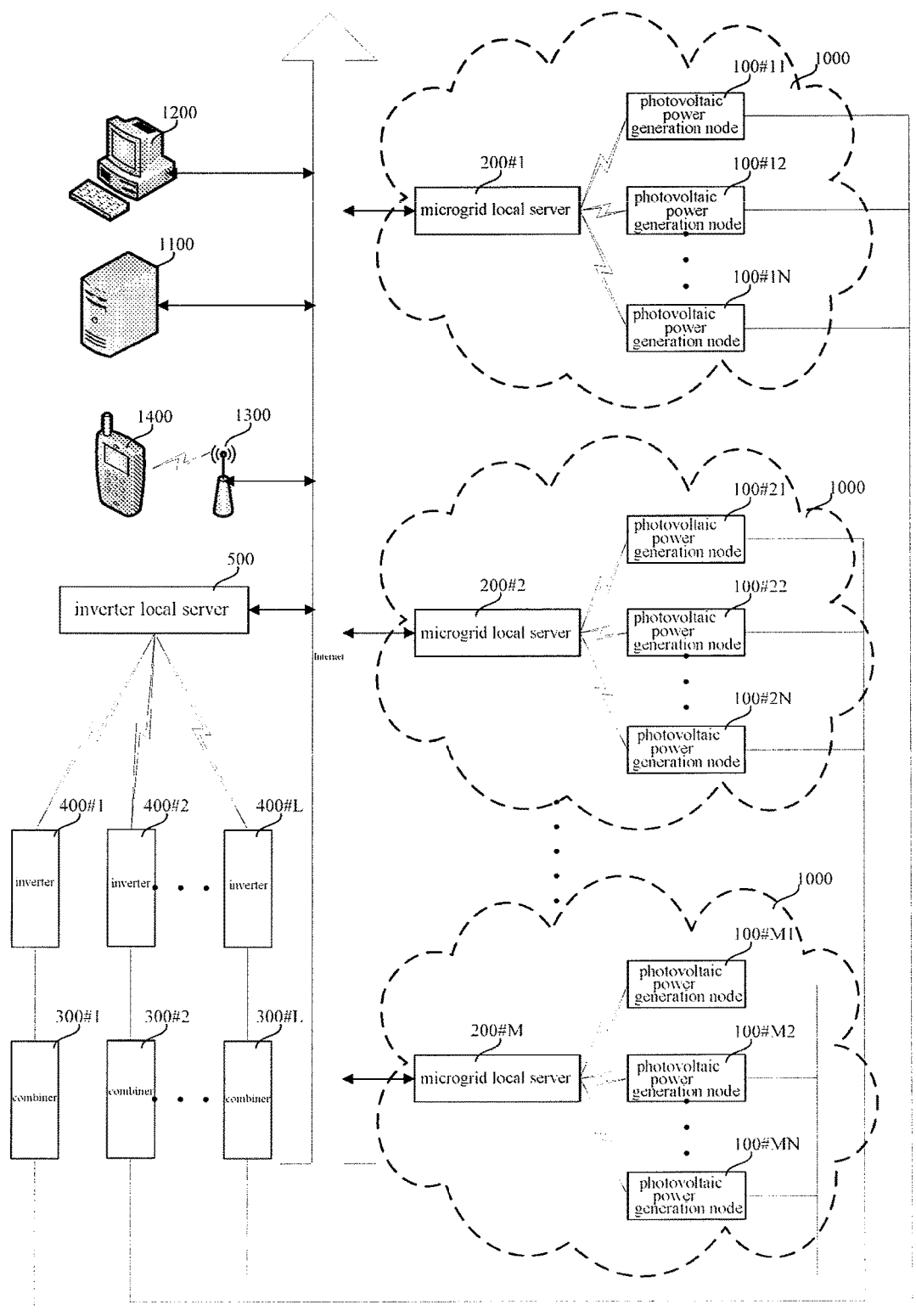
FIG. 1 is a structure diagram showing a photovoltaic power generation system of one embodiment of the present disclosure.

Various exemplary examples, features and aspects of the present disclosure will be described in detail with reference to the drawings. The same reference numerals in the drawings represent parts having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples.

Numerous details are given in the following examples for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure become apparent.

Embodiment 1

FIG. 1 is a structure diagram showing a photovoltaic power generation system of one embodiment of the present disclosure. As shown in FIG. 1, the photovoltaic power generation system comprises at least one photovoltaic power generation microgrid 1000 and a central server 1100 configured to communicate with each photovoltaic power generation microgrid through the Internet. Each photovoltaic power generation microgrid comprises:

a plurality of photovoltaic power generation node 100, each comprising a photovoltaic power generation module (e.g., the solar cell module 110 in FIG. 2), a sensor module (e.g., the sensor module 140 in FIG. 2) configured to collect status parameter of the photovoltaic power generation node, and a wireless communication module (e.g., the CC2530 module 130 in FIG. 2) configured to wirelessly transmit the status parameter of the photovoltaic power generation node; and a microgrid local server 200 configured to receive the status parameter of each photovoltaic power generation node 100, determine, based on the received status parameter of each photovoltaic power generation node 100, an operating status of each photovoltaic power generation node 100, and transmit the received status parameter and the determined operating status to the central server 1100 through the Internet, such that the central server 1100 can display the status parameter and the operating status of each photovoltaic power generation node 100.

As shown in FIG. 1, the photovoltaic power generation system may comprise one central server 1100 and a plurality of (M+1) inter-independent wireless sensor microgrids 1000, including M photovoltaic power generation microgrids and one inverter microgrid, which communicate with the central server 1100 through the Internet. Each of the photovoltaic power generation microgrids may comprise one microgrid local server and N photovoltaic power generation nodes in wireless communication with the microgrid local server. For example, the microgrid local server 200#1 connects with the photovoltaic power generation nodes 100#11 to 100#1N, the microgrid local server 200#2 connects with the photovoltaic power generation nodes 100#21 to 100#2N, and the microgrid local server 200#M connects with the photovoltaic power generation nodes 100#M1 to 100#MN. Further, the system may also comprise a personal computer (PC) terminal 1200 in communication with the central server 1100 through the Internet and a mobile terminal 1400 in wireless communication with the central server 1100 through a 3G base station 1300. DC power output by an information-based photovoltaic module array formed of all of the photovoltaic power generation nodes 100 in the system is connected in series and in parallel and is brought into connection with L inverters 400#1 to 400#L via combiners 300#1 to 300#L. The L inverters communicate with an inverter local server 500 in a wireless manner. Wherein L and N are integers larger or equal to 1 and less than 100, and M is an integer no less than 1. L and N may or may not be equal. This embodiment of the present disclosure does not limit the specific values of L, N and M. In addition, the number of the combiners and the number of the inverters may not be equal.

Figure 2:
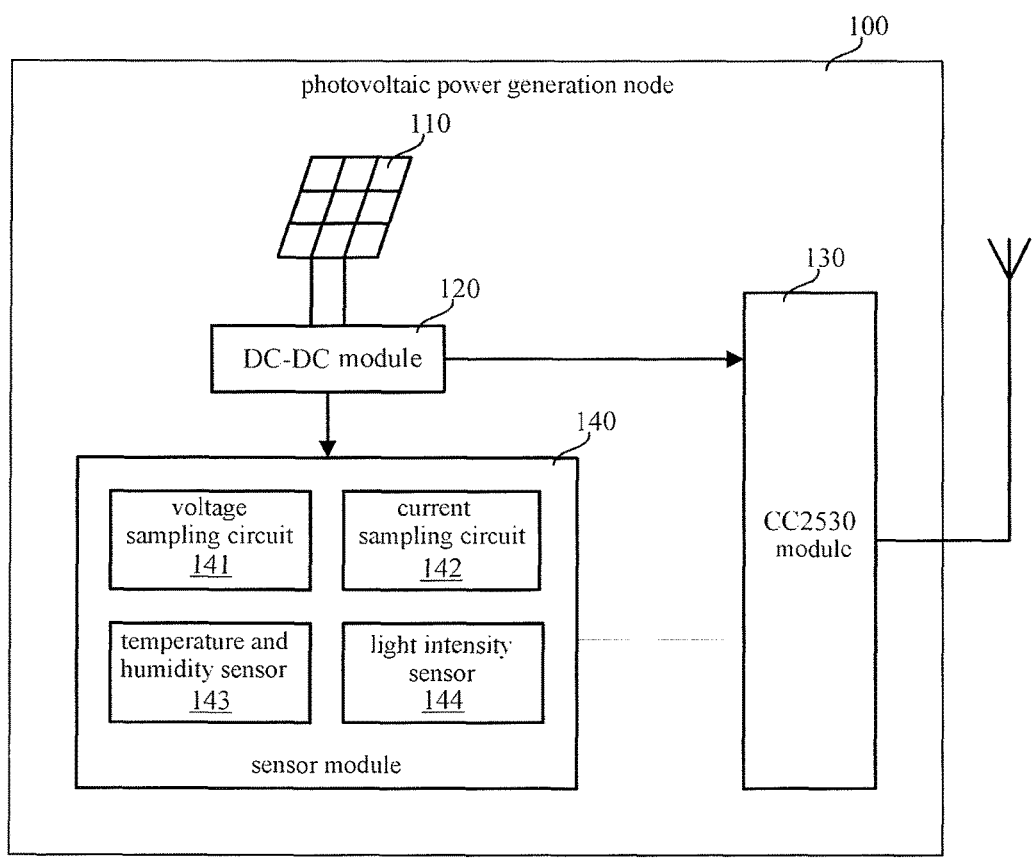
FIG. 2 is a structure diagram showing a photovoltaic power generation node of a photovoltaic power generation system of one embodiment of the present disclosure.

As shown in FIG. 2, the photovoltaic power generation node 100 may comprise the solar cell module 110, a direct current-direct current (DC-DC) module 120, the CC2530 module 130 (having a function of wireless communication) and a sensor module 140. The sensor module 140 may comprise at least one of a voltage sampling circuit 141, a current sampling circuit 142, a temperature and humidity sensor 143 and a light intensity sensor 144, and, of course, may be provided with a sensor having other functions as needed. Specifically, the solar cell module 110 is in connection with the DC-DC module 120 and the combiner 300 respectively; the output port of the DC-DC module is connected to the CC2530 module 130 and the sensor module 140 respectively; the voltage sampling circuit 141 and the current sampling circuit 142 each has one port connected to an output port of the solar cell module 110 and another port connected to an I/O port of a 8051 microcontroller embedded in the CC2530 module 130, for collecting voltage parameter and current parameter of the solar cell module 110 respectively; the temperature and humidity sensor 143 and the light intensity sensor 144 are connected with the I/O port of the 8051 microcontroller embedded in the CC2530 module 130, the temperature and humidity sensor 143 used for collecting temperature and humidity parameters of the solar cell module 110 and the light intensity sensor 144 used for collecting light intensity parameter of the environment where the solar cell module 110 is installed.

During operation of the photovoltaic power generation node 100, on one hand, the solar cell module 110 converts solar energy into electrical power and transmits the electrical power to the combiner 300 via an output port; on the other hand, the DC-DC module 120 is connected with the output port of the solar cell module 110 and steps down the DC power output by the solar cell module 110 to low voltage DC power of for example +12V, +5V and +3.3V, so as to supply power for other modules of the photovoltaic power generation node 100. In addition, the voltage sampling circuit 141 and the current sampling circuit 142 may collect voltage parameter and current parameter at the output port of the solar cell module 110 to transmit to the I/O port of the 8051 microcontroller embedded in the CC2530 module, thereby completing the collection of the electrical parameters. The temperature and humidity sensor 143 is tightly attached to a back plate of the solar cell module 110 to detect the parameters including the temperature and the humidity of the solar cell module 110. The light intensity sensor 144 is embedded in a front face of the solar cell module 110 to collect the light intensity parameter of the environment. The environmental and electrical parameters are important grounds for comprehensively determining the operating status of the solar cell module 110. The CC2530 module 130 in the photovoltaic power generation node 100 may transmit the parameters collected by the sensor module 140 to a corresponding microgrid local server 200 in a wireless manner, so as to complete wireless transmission of the status parameter of the photovoltaic power generation node 100.

For instance, the photovoltaic power generation node 100 may use a high-efficiency SUN-220 type crystalline silicon solar cell module 110; the DC-DC module 120 may use a design of a high-performance LTC3255 switched-capacitor step-down converter; the current sampling circuit 142 may use a DC current sensor TBC10SY to collect an output current of the photovoltaic module; the voltage sampling circuit 141 may use a voltage dividing circuit and a voltage follower circuit to sample the output voltage of the photovoltaic module; the temperature and humidity sensor 143 may use a SHT11 digital temperature and humidity sensor to collect environmental parameters of the back plate of the solar cell module; the light intensity sensor 144 may use a TSL2561 digital light intensity sensor to collect light intensity parameter of a front face of the solar cell module 110. The electrical parameters and the environmental parameters collected by all the above sensor modules may be transmitted to the I/O port of the 8051 microcontroller embedded in the CC2530 module 130. The CC2530 module 130 may use a CC2530F128 chip design, which may, by writing an initialization program and application programs, perform initialization and networking of the photovoltaic power generation node 100.

In this embodiment of the disclosure, first, according to the construction scale and the geographical position of the photovoltaic power generation plant, a network topology of the photovoltaic power generation system may be designed in accordance with the following rules: dividing all of the photovoltaic power generation nodes 100 into several matrix units (which may be square matrixes or in any shape relatively concentrated in a small region), each matrix unit having a microgrid local server 200 installed at a geometrical center thereof, setting the procedure of the power plant construction and the physical address of the photovoltaic power generation node 100 in compliance with the rule for dividing the matrix units, and obtaining the identification (ID) number of the photovoltaic power generation node 100 via the positioning assisting terminal during the power plant construction. After all photovoltaic power generation nodes 100 are installed, according to the topological relation of the network structure and the requirement for the electrical parameters of the whole power plant, a corresponding number of the microgrid local server 200, the inverter local server 500 and the inverter 400 are installed, and the output ports of all photovoltaic power generation nodes 100 are, after being connected in series and in parallel, connected to the inverter 400 via the combiner 300. Finally, the microgrid local server 200, the inverter local server 500, the central server 1100 and the PC terminal 1200 may access the Internet to perform networking operation of the system. In addition, the mobile terminal 1400 with a 3G module can access the central server 1100 through a 3G base station 1300 that accesses the Internet.

Preferably, the PC terminal 1200 may comprise a desktop, a portable computer and an industrial personal computer, etc., and access the Internet in an effective way. The software running on the PC terminal may directly download all operating status information from the central server 1100, including historical data. The mobile terminal 1400 may be a mobile phone, a PAD and a portable computer with a 3G module. The software running thereon usually may merely download major real-time parameters form the central server 1100, for example the overall status parameter of the system and malfunction warning data, etc.

Embodiment 2

Figure 3:
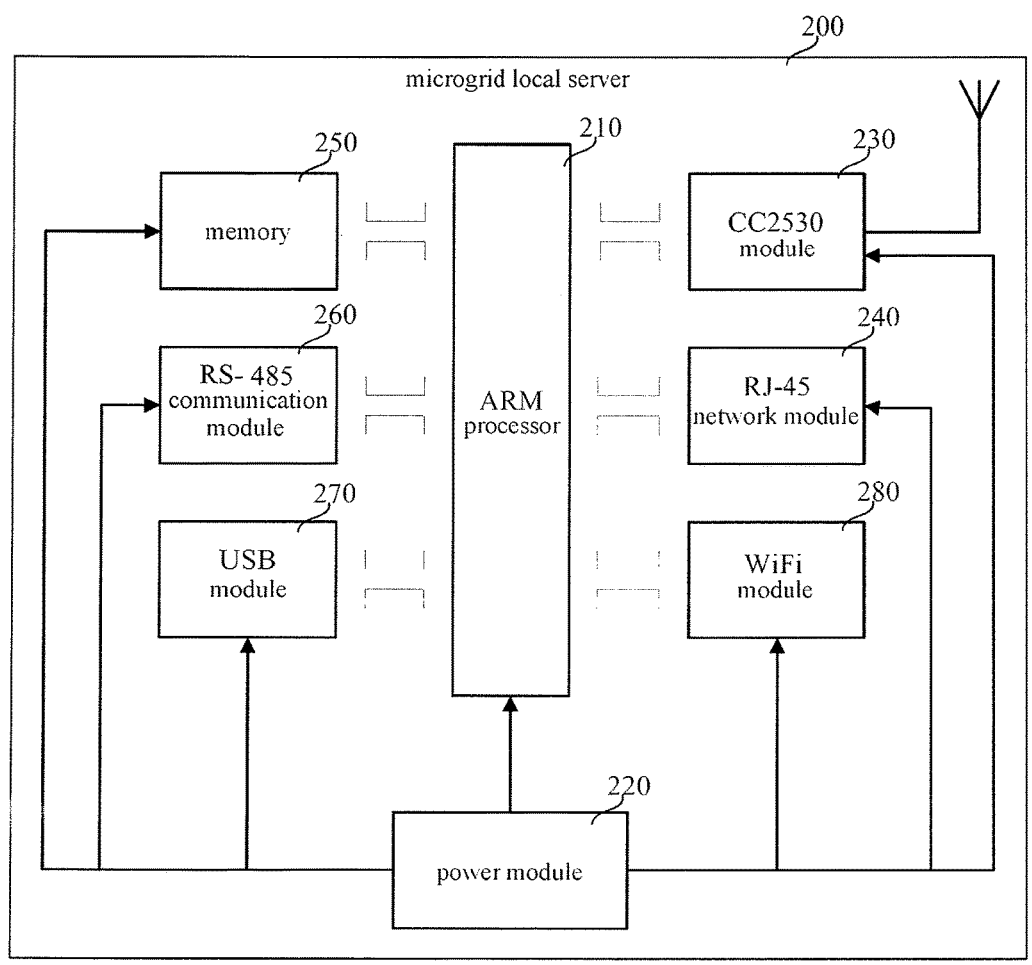
FIG. 3 is a structure diagram showing an example of the microgrid local server of a photovoltaic power generation system of one other embodiment of the present disclosure.

FIG. 3 is a structure diagram showing an example of the microgrid local server of a photovoltaic power generation system of one other embodiment of the present disclosure. On the basis of the previous embodiment, the photovoltaic power generation system may further comprise a memory (see the memory 250 in the microgrid local server 200 in FIG. 3), and the memory 250 stores the physical address and the ID number of the photovoltaic power generation node 100 in a correlated manner. Referring to FIG. 1, when determining that a malfunction occurs in a particular photovoltaic power generation node 100 based on the received status parameters of the photovoltaic power generation nodes 100, the microgrid local server 200 retrieves, based on the ID number of the particular photovoltaic power generation node 100, a corresponding physical address from the memory, and transmits a message indicating that the malfunction occurs in the photovoltaic power generation node 100 at the physical address via the central server 1100 to particular terminals 1200, 1400.

Providing the memory 250 inside the microgrid local server 200 as shown in FIG. 3 is merely an example. Instead, the memory may be provided at the central server 1100, or an independent memory may be used.

Referring to FIG. 3, the microgrid local server 200 in the photovoltaic power generation microgrid may comprise a power module 220, an ARM processor 210, a CC2530 module 230, a WiFi module 280, a USB module 270, a RS-485 communication module 260, a memory 250 and an RJ-45 network module 240. The power module 220 is connected with the ARM processor 210, the CC2530 module 230, the WiFi module 280, the USB module 270, the RS-485 communication module 260, the memory 250 and the RJ-45 network module 240 respectively to supply power for the above modules. The CC2530 module 230 is connected with a high-speed microprocessor such as the ARM processor 210 through serial interface. The ARM processor 210 may perform information communication in multiple ways with other external devices through various interface modules such as the RS-485 communication module 260, the USB module 270, the WiFi module 280, the RJ-45 network module 240, and the like.

In this embodiment, the high-speed embedded system is mainly realized by the ARM processor, and also may be realized by FPGA, CPLD, etc. instead. The USB module is mainly used for on-site commissioning, direct data retrieval, and data transmission with other modules connected by USB. During use, the USB module can be connected by a USB data cable, and then the on-site commissioning may be performed by commissioning software, or data in the memory of the microgrid local server could be read. The RS-485 communication module is a standard industrial data transmission module that can be used for data transmission between the microgrid local servers or communication between the microgrid local server and other external devices, for example, the electrical devices such as the central server and the inverter. During use, it can be directly connected by a data cable. The WiFi module mainly assists short-distance wireless transmission between the microgrid local server and the external devices. The external devices may be a switch connected to the central server or a special data accessing and receiving terminal, for example, a portable computer installed with special software. Also, the WiFi module can be used as a wireless signal relay station for an adjacent microgrid local server to connect to the Internet. On a control panel of the microgrid local server, a communication configuration column may be clicked to launch WiFi, then the WiFi module starts to work according to the actual demand. If there is a need to access the Internet, the RJ-45 module has a priority. When there is access to a wired network, the WiFi module enters a waiting mode where it can be used as a wireless relay station for adjacent local servers.

When the microgrid local server 200 in the photovoltaic power generation microgrid works, the power module 220 first converts a 220V AC power (commercial power supply, which may operate continuously) into low-voltage DC power of for example +12V, +5V and +3.3V, so as to supply power for the other modules. After successful networking of the system, the CC2530 module 230 transmits status parameter transmitted from the photovoltaic power generation nodes 100 to the ARM processor 210 connected thereto through serial interface in a real-time manner, and the ARM processor 210 may directly store the received data in the memory 250 as a status parameter table. In addition, when the RJ-45 network module 240 accesses the Internet, the ARM processor 210 may transmit the data of the memory 250 in real time to the central server 1100, so as to realize permanent storage of the status parameter of the photovoltaic power generation system.

For instance, in the microgrid local server 200, the WiFi module 280 may use an RTL8188CUS chip design, the USB module 270 may use a PL2303HX chip design, the RS-485 communication module 260 may use a MAX485CPA chip design, the CC2530 module 230 may use a CC2530F128 chip design, the RJ-45 network module 240 may use a DM9000 chip design, the ARM 210 may use an S3C6410XH chip design, and the memory 250 may use an M29W032DB chip design. Further, by writing programs in the CC2530F128 chip and the S3C6410XH chip, the networking of the microgrid local servers is conducted.

Figure 4:
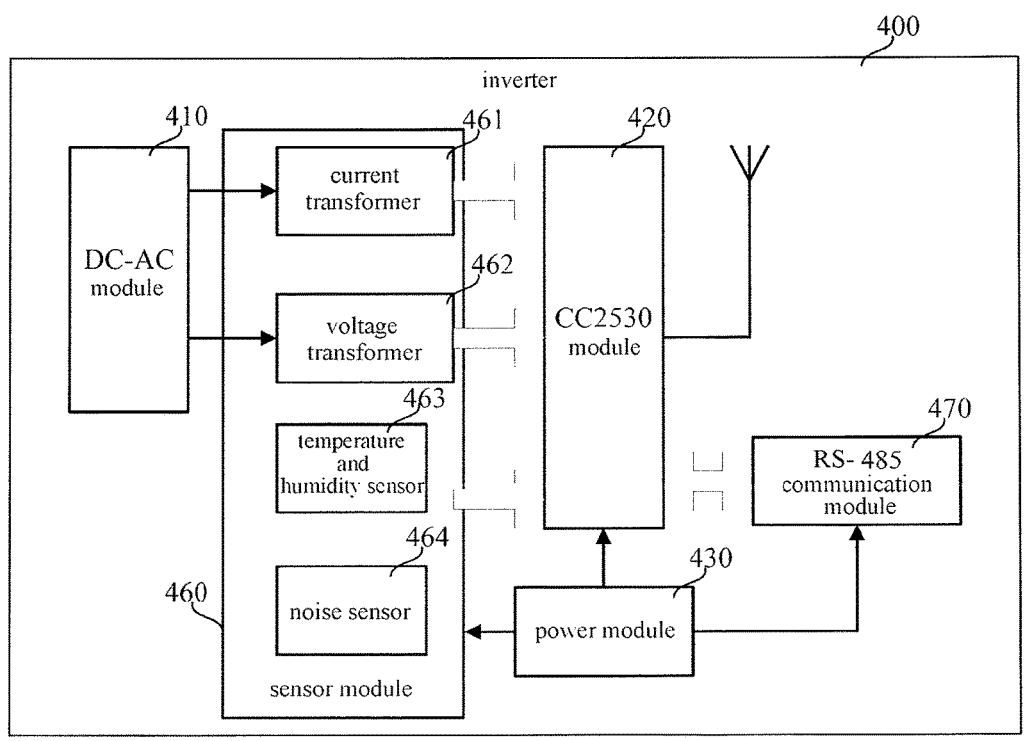
FIG. 4 is a structure diagram showing an inverter of a photovoltaic power generation system of one other embodiment of the present disclosure.

In a possible implementation, as shown in FIGS. 1 and 4, the photovoltaic power generation system may further comprise:

at least one inverter 400, each comprising a direct current-alternating current converting module (see the DC-AC module 410 shown in FIG. 4) configured to convert the DC power output by at least one of the photovoltaic power generation nodes into AC power, a sensor module 460 configured to collect the status parameter of the inverter, and a wireless communication module (see the CC2530 module 420 in FIG. 4) configured to wirelessly transmit the status parameter of the inverter; and an inverter local server 500 configured to receive the status parameter of the inverter and transmit the received status parameter of the inverter to the central server through the Internet.

The structure of the inverter local server 500 may refer to the description in FIG. 3 with regard to the microgrid local server 200. The inverter local server 500 and the inverter 400 connected thereto may also form a wireless sensor microgrid.

Referring to FIG. 4, the inverter 400 may comprise a power module 430, a DC-AC module 410, a CC2530 module 420, a RS-485 communication module 470 and a sensor module 460. The sensor module 460 may include at least one of a current transformer 461, a voltage transformer 462, a temperature and humidity sensor 463 and a noise sensor 464. The power module 430 is connected with the CC2530 module 420, the RS-485 communication module 470 and the sensor module 460 to supply power for these modules. The DC-AC module 410 has an input port connected with the inverter and an output port connected to the AC combiner 300. The DC-AC module is further connected with an I/O port of an 8051 microcontroller embedded in the CC2530 module 420 through the current transformer 461 and the voltage transformer 462. The temperature and humidity sensor 463 and the noise sensor 464 collect internal parameters of an inverter case, and are connected with the I/O port of the 8051 microcontroller embedded in the CC2530 module 420. The CC2530 module 420 also performs information communication with other external devices through the RS-485 communication module 470.

When the inverter 400 is working, the power module 430 may convert the 220V AC power into a low-voltage DC power of for example +12V, +5V and +3.3V, so as to supply power for the other modules. The current transformer 461 is used for collecting current parameter of the inverter, and the voltage transformer 462 collects voltage parameter of the inverter. The current transformer 461 and the voltage transformer 462 collect electrical parameters of the DC side and the AC side of the trunk circuit and transmit the parameters to the I/O port of the 8051 microcontroller embedded in the CC2530 module, which has an A/D function, through a signal converting circuit, so as to complete the collection of electrical parameters. The temperature and humidity sensor 463 and the noise sensor 464 are disposed inside the inverter case and detect parameters including the temperature, the humidity and the noise inside the case of the inverter 400. The CC2530 module of the inverter 400 has a radio frequency transceiving module that may regularly transmit the collected electrical parameter to the inverter local server 500 in a wireless radio frequency manner, so as to complete wireless transmission of the status parameter of the inverter.

For example, in the information-based inverter of the embodiments of the present disclosure, the RS-485 communication module 470 may use a MAX485CPA chip design, the current transformer 461 may use a KCE-IZ01 type DC current transformer and a TA1626-4M type AC current transformer, the voltage transformer 462 may use a JLBV1000FA type DC voltage transformer and a TVS1908-03 type AC voltage transformer, a SHT11 digital temperature and humidity sensor 463 and a TZ-2KA type noise sensor 464 collect environmental parameters of the inverter case. All of the electrical parameters and the environmental parameters collected by the sensor module 460 may be transmitted to the I/O port of the 8051 microcontroller embedded in the CC2530 module 420. Moreover, the CC2530 module 420 may use a CC2530F128 chip design, into which application programs are written to perform networking of the inverter 400. The DC-AC module 410 may be implemented by using the inverter usually used by photovoltaic power plants, which has a function of converting DC power into AC power. The RS-485 communication module 470 is connected with a serial interface of the CC2530F128 chip to be connected to other external devices.

Figure 5:
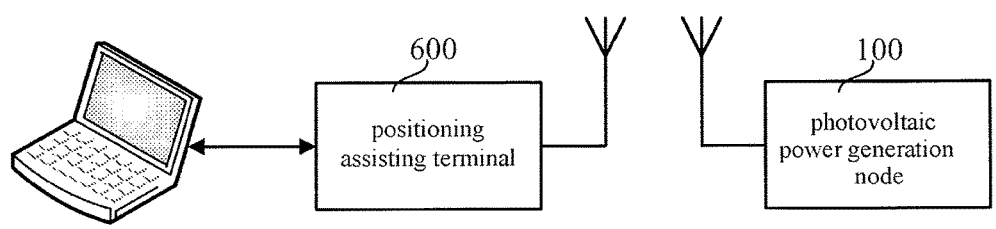
FIG. 5 and FIG. 6 are structure diagrams showing a positioning assisting terminal of a photovoltaic power generation system of one other embodiment of the present disclosure.

In a possible implementation, referring to FIG. 5, this embodiment may use a positioning assisting terminal 600 to perform correlated storage of the ID number and the physical address of the photovoltaic power generation node 100. In this embodiment, the positioning assisting terminal 600 determines a physical address at which a photovoltaic power generation node 100 is to be installed and obtains an ID number of the photovoltaic power generation node 100 to be installed at the physical address, and, after storing the physical address and the ID number in a correlated manner, prompt the operator to install the photovoltaic power generation node 100 at the physical address. The correlation of the physical address and the ID number may be stored as a lookup table in the database, which may be subsequently introduced into a corresponding microgrid local server 200.

Specifically, in one step of the production of the photovoltaic power generation node 100, for example, in the last step, a corresponding application program and an initialization program may be written. When the solar cell module 110 of the photovoltaic power generation node receives illumination, the CC2530 module 130 starts to work, first running the initialization program, and transmitting its ID number to the surrounding positioning assisting terminals 600. If some positioning assisting terminal 600 receives the data information of the ID number and successfully matches the ID number with a prescribed corresponding physical address, the positioning assisting terminal 600 transmits a confirmation instruction to the CC2530 module of the photovoltaic power generation node 100, and prompts the on-site operator by an audible and/or visible message. When the CC2530 module 130 of the photovoltaic power generation node 100 receives the confirmation instruction, a light emitting diode (LED) indicating lamp turns on for example 5 seconds and then turns off to indicate that the initialization process is completed. Then the application program runs. The initialized photovoltaic power generation node 100 would directly run the application program when powered on later. If the CC2530 module does not receive confirmation instruction from any positioning assisting terminal all the time after the initialization program runs when the photovoltaic power generation node is illuminated after being unpacked, the initialization program will loop. It should be noted that, generally, a photovoltaic power generation node that does not complete the initialization process cannot participate in the networking.

Figure 6:
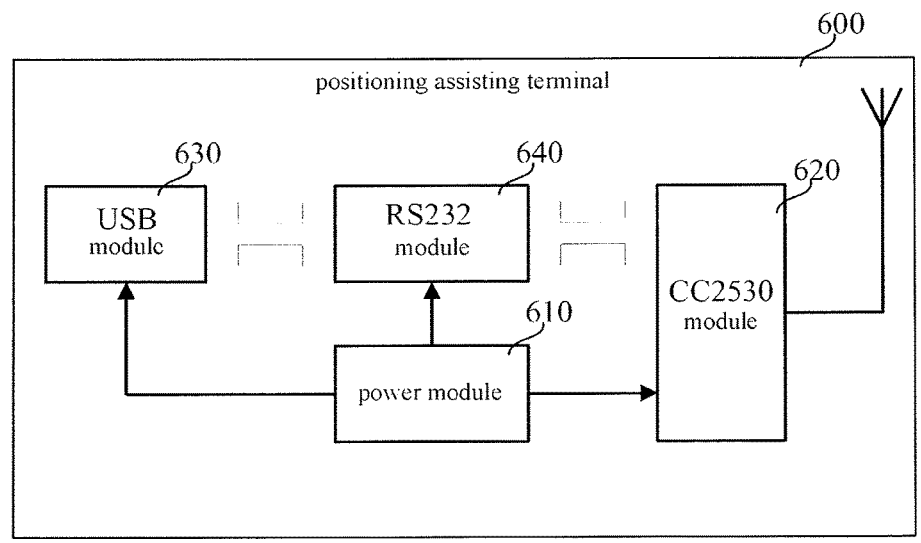

Referring to FIG. 6, the positioning assisting terminal 600 may comprise a power module 610, a CC2530 module 620, a USB module 630 and a RS232 module 640. The power module 610 is respectively connected with the CC2530 module 620, the USB module 630 and the RS232 module 640, so as to supply power to these modules. The CC2530 module 620 is connected with a user terminal, for example, a portable computer, through the RS232 module 640 and the USB module 630, for transmitting an ID number of the photovoltaic power generation node 100.

When the positioning assisting terminal 600 works, the power module 610 first converts +5V power into +3.3 V power to supply power for the CC2530 module 620, the USB module 630 and the RS232 module 640. When being connected to a portable computer through a USB interface 630, the positioning assisting terminal transmits a search instruction through the CC2530 module 620. When receiving an ID number of a photovoltaic power generation node transmitted by itself, the positioning assisting terminal transmits the ID number to the portable computer through the RS232 module 640 and the USB module 630. After the computer completes the matching of the ID number and physical address, an instruction is transmitted to the CC2530 module 620 which forwards the instruction to the photovoltaic power generation node to inform the completion of the initialization process.

For example, in the positioning assisting terminal 600, the USB module 630 may use a PL2303HX chip design, the RS232 module 640 may use a MAX3232E chip design, and the CC2530 module 620 may use a CC2530F128 chip design. By writing a positioning assisting terminal program and running an associated application program on the portable computer, the positioning assisting terminal 600 may assist establishing a lookup table of the ID number-physical address of the photovoltaic power generation nodes, thereby completing networking of the information-based photovoltaic module array.

It should be noted that the CC2530 module provided inside the photovoltaic power generation node, the microgrid local server, the inverter, the inverter local server, the positioning assisting terminal, and so on in the embodiments of the present disclosure mainly comprises a wireless communication module and a microprocessor, and is capable of performing signal processing and wireless transmission of data. The CC2530 module has a self-networking function and can be implemented by MCU+CC2420, CC2430, CC2431, CC2531, CC2533, LPR2430, MCU+nRF905, MCU+nRF2401, and so on.

The photovoltaic power generation system provided in the present disclosure has a flexible multiple microgrid structure, and thus can obtain status parameter of the photovoltaic power generation nodes in each microgrid, thereby accurately monitoring the operating status of each photovoltaic power generation node. The data has coherent network architecture and is featured as complete, accurate, stable and credible data and with high robustness, which improves the efficiency of the photovoltaic power generation system, thereby reducing the cost of power generation.

In addition, wireless sensor network system is applied to construct an information network system based on organic combination of wired and wireless communication, which helps convenient and credible information transmission and intelligent system management, improves stability and credibility of system operation, and extends the life span of the system.

Furthermore, by remote control over the inverter, optimization strategy can be performed for the conversion of electricity, improving the efficiency of the whole system. Multiple terminal modes are applied to satisfy requirements of customers of various identifications, which bring the features of complete information, direct display and simple and convenient operation.

Furthermore, the central server may use a professional database to manage and store data, benefiting integral information, scientific management, safety and stability and convenient use. Application of multiple terminals may satisfy the requirements of customers of various identifications, and has the significant advantages of direct display, simple and convenient operation and effective management.

Specifically, the information-based photovoltaic power generation system of a multiple microgrid structure may be used in a large-scale photovoltaic power plant having an array-based layout, a photovoltaic power plant installed in multiple scattered regions in a distributed manner, a small-scale photovoltaic power plant, multiple home photovoltaic power plants distributed separately, and a roof photovoltaic power plant, etc. Each photovoltaic power generation microgrid comprises a microgrid local server and several photovoltaic power generation nodes, and the networking method is self-networking, thereby having the features of flexible network architecture, convenient and quick network access and networking, high expansibility of network topology, etc. The independent microgrid may be connected with the central server through the Internet, which facilitates management and maintenance by remote access of the customer. The microgrid also stores historical data of the operating status of the photovoltaic power generation nodes in the local memory for a certain period. Therefore, the microgrid can still operate independently when it is disconnected from the network and upload the historical data to the central server when it joins the network again. When the microgrid is disconnected from the network, the customer may directly link (e.g., by USB connection) to the microgrid local server through a terminal device (e.g., a laptop), so as to access the status parameter of each photovoltaic power generation node of an independent microgrid.

Embodiment 3

Figure 7:
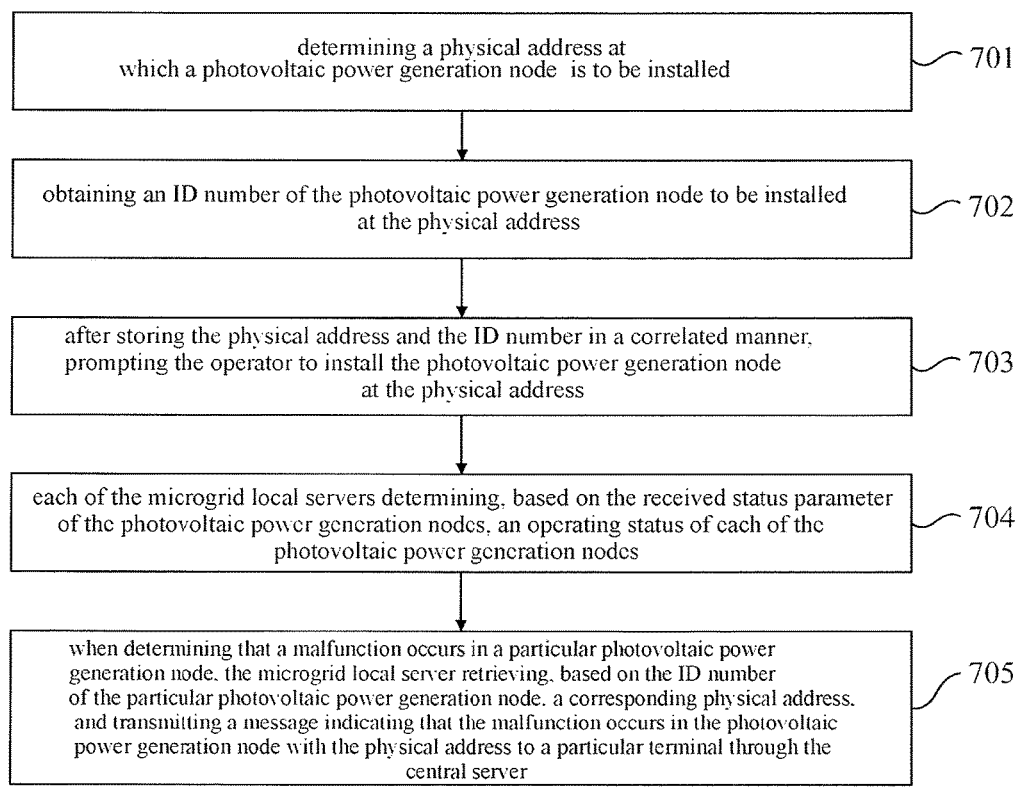
FIG. 7 is a flowchart of a malfunction detection method for a photovoltaic power generation system provided in one embodiment of the present disclosure.

FIG. 7 is a flowchart of a malfunction detection method for a photovoltaic power generation system provided in one embodiment of the present disclosure. The malfunction detection method may be applied for a photovoltaic power generation system of any structure in the above embodiments. The method may specifically comprise the following steps:

Step 704, each of the microgrid local servers determining, based on the received status parameter of the photovoltaic power generation nodes, an operating status of each of the photovoltaic power generation nodes;

Step 705, when determining that a malfunction occurs in a particular photovoltaic power generation node, the microgrid local server retrieving, based on the ID number of the particular photovoltaic power generation node, a corresponding physical address, and transmitting a message indicating that the malfunction occurs in the photovoltaic power generation node with the physical address to a particular terminal through the central server.

In one possible implementation, the physical address and the ID number of each of the photovoltaic power generation nodes may be stored in a correlated manner in advance, specifically, comprising the following steps:

Step 701, determining a physical address at which a photovoltaic power generation node is to be installed;

Step 702, obtaining an ID number of the photovoltaic power generation node to be installed at the physical address;

Step 703, after storing the physical address and the ID number in a correlated manner, prompting the operator to install the photovoltaic power generation node at the physical address.

The correlated ID number and the physical address of each photovoltaic power generation node connected with the microgrid local server may be introduced to each microgrid local server, so that when a photovoltaic power generation node is determined to have a malfunction, the position of the malfunctioned node may be conveniently determined, and the processing such as malfunction elimination could be conducted accordingly.

Embodiment 4

Figure 8:
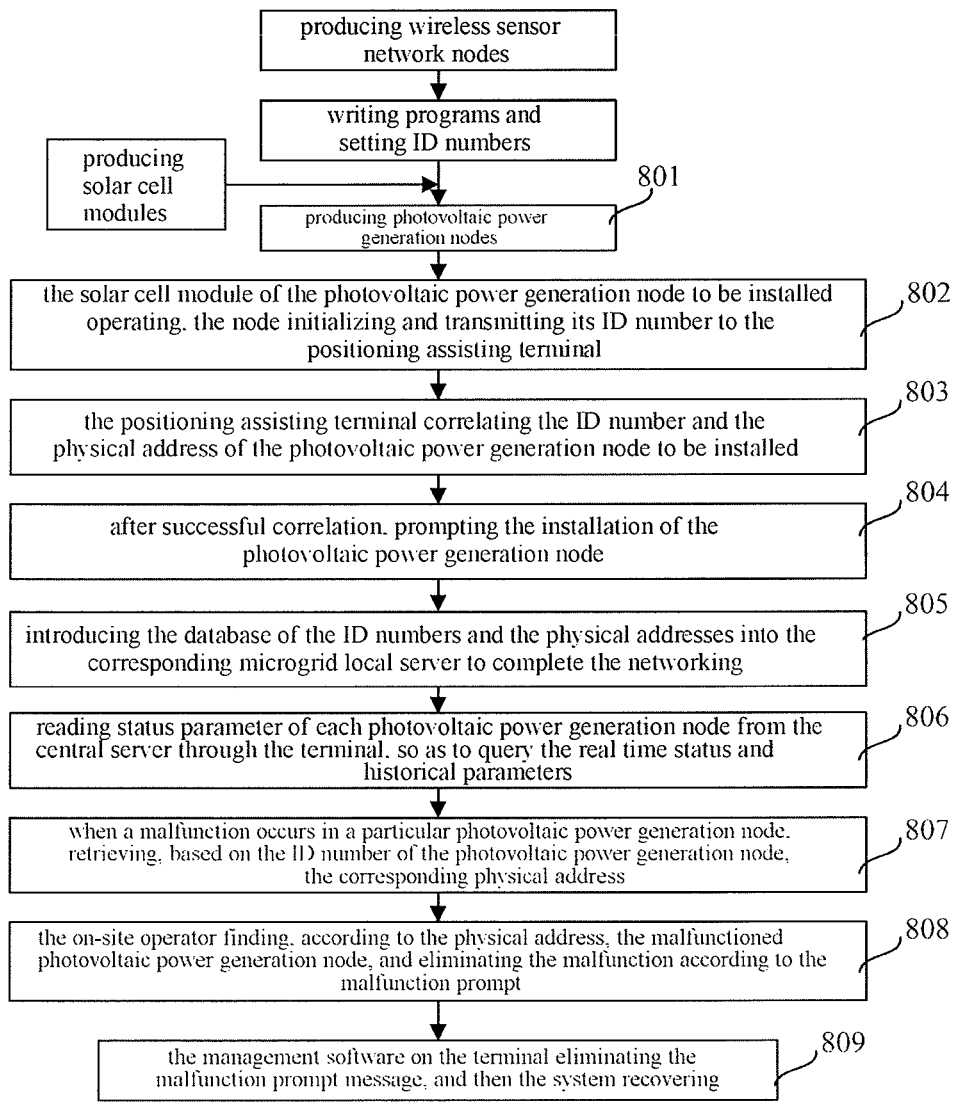
FIG. 8 is a flowchart of a malfunction detection method for a photovoltaic power generation system provided in one other embodiment of the present disclosure.

FIG. 8 is a flowchart of a malfunction detection method for a photovoltaic power generation system provided in one other embodiment of the present disclosure. The malfunction detection method may be applied for a photovoltaic power generation system of any structure in the above embodiments. The method may specifically comprise the following step:

Step 801, producing photovoltaic power generation nodes.

Specifically, referring to FIG. 2, during the production of the photovoltaic power generation node 100, there may be produced wireless sensor network nodes including components such as the sensor module 140 and the CC2530 module 130, and corresponding programs may be written into the CC2530 module 130 in the wireless sensor network nodes, with unique ID numbers given. For example, the program written into the CC2530 module 130 of the photovoltaic power generation node 100 is divided into two parts, i.e. the initialization program including setting unique 64-bit binary ID number, and the application program for realizing functions of the sensor module, such as information collection, processing and storage, and capable of regular transmission of the collected data in a wireless manner. Then, the produced solar cell module 110 and the wireless sensor network nodes may be assembled to obtain the photovoltaic power generation node.

Step 802, the solar cell module 110 of the photovoltaic power generation node to be installed operating, the node initializing and transmitting its ID number to the positioning assisting terminal. Specifically, referring to FIGS. 2, 5 and 6, when the photovoltaic power generation node 100 is installed on-site, the package of the photovoltaic power generation node 100 is unpacked so that the solar cell module 110 thereof receives illumination, the CC2530 module 130 starts to operate and first transmit the ID number to the positioning assisting terminal 600.

Step 803, the positioning assisting terminal 600 correlating the ID number and the physical address of the photovoltaic power generation node to be installed. Specifically, a portable computer connected with the positioning assisting terminal 600 runs software and correlates the actual physical address with the ID number according to prescribed installation procedure.

Step 804, after successful correlation, prompting the installation of the photovoltaic power generation node 100.

For example, if the photovoltaic power generation array in the photovoltaic power generation system is divided into several matrix units (photovoltaic power generation microgrids), each matrix unit will comprise 50 photovoltaic power generation nodes distributed in 5 rows*10 columns. The first matrix unit follows the following naming rule: the physical addresses of the photovoltaic power generation nodes in the first row are A0101-A0110 (A stands for the area, the first two numbers for the number of row and the last two numbers for the number of column), the physical addresses of the photovoltaic power generation nodes in the second row are A0201-A0210, . . . , the physical addresses of the photovoltaic power generation nodes in the fifth row are A0501-A0510. The second matrix unit follows the following naming rule: the physical addresses of the photovoltaic power generation nodes in the first row are A0111-A0120, the physical addresses of the photovoltaic power generation nodes in the second row are A0211-A0220, . . . , the physical addresses of the photovoltaic power generation nodes in the fifth row are A0511-A0520, etc. The same naming rule is applied in the rest matrix units.

During the on-site construction, the installation should be performed according to the network topology divided by the above division rules. Constructions for several matrix units may be performed simultaneously. Taking the construction of the first matrix unit as example, it is required that the installation is performed according to the physical address subsequence of A0101, A0102, A0103, . . . , A0110, A0201, A0202, A0203, . . . , A0210, A0301, A0302, A0303, . . . , A0310, A0401, A0402, A0403, . . . , A0410, A0501, A0502, A0503, . . . , A0510.

First, in the positioning assisting software installed in the positioning assisting terminal 600 and the connected portable computer, according to the physical address setting rules, the first default physical address is A0101. When the first photovoltaic power generation node 100 is unpacked, since the solar cell module 110 thereof receives illumination and starts power generation, the DC-DC module 120 of the photovoltaic power generation node 100 operates, and the CC2530 module 130 is powered up to operate, running the initialization program and regularly and repeatedly transmitting its ID number. When a direct distance between the photovoltaic power generation node 100 and the positioning assisting terminal 600 is less than a certain length, for example, 5 meters, the positioning assisting terminal may effectively read the ID number transmitted by the CC2530 module 130 of the photovoltaic power generation node 100.

When the positioning assisting terminal 600 acquires the ID number, it may transmit the ID number to the connected portable computer through the USB interface 630. The portable computer transmits, after recording with software the physical address A0101 and the ID number of the photovoltaic power generation node 100, a confirmation instruction to the positioning assisting terminal 600, and provides an audible and/or visible prompt for the on-site operator. The positioning assisting terminal 600 transmits the confirmation instruction to the photovoltaic power generation node 100 to be installed through the CC2530 module 620. After receipt of the confirmation instruction, the photovoltaic power generation node 100 completes program initialization. The LED indicating lamp of the photovoltaic power generation node turns on for 5 seconds and then turns off to indicate that the on-site operator may install the initialized photovoltaic power generation node 100 at the position with the physical address A0101. The successfully initialized photovoltaic power generation node 100 would directly run the application programs without running the initialization program when powered on later.

The rest photovoltaic power generation nodes are installed in subsequence according to similar steps. Each matrix unit in the present embodiment needs a microgrid local server 200 to be installed at a position, preferably at the geometrical center of the matrix unit. The photovoltaic power generation nodes in the embodiments of the present disclosure are installed indifferently, i.e., there is no order in the on-site installation of a group of photovoltaic power generation nodes, and any one of the group of photovoltaic power generation nodes could be picked out to be installed at any position. However, each of photovoltaic power generation nodes is uniquely numbered with an ID number during the production. The ID number is the unique identifier for identifying the solar cell module 110. For the purpose of on-site inspection and maintenance, there is further a need to physically addressing the photovoltaic power generation nodes installed on site, for example, A0206 (representing the solar cell module 110 in the second row and sixth column). The on-site operator could search for the photovoltaic power generation nodes merely by the physical addresses. Therefore, there is a need to match the physical address with the ID number of the photovoltaic power generation node installed at the physical address during the installation.

In addition, each inverter may be installed similarly.

Step 805, introducing the database of the ID numbers and the physical addresses generated by the positioning assisting terminal 600 and the software into a corresponding microgrid local server 200 to complete the networking of the whole photovoltaic power generation system having multiple microgrid architecture.

For example, if there are multiple construction teams in Step 702, a plurality of positioning assisting terminals and software can be used to generate a plurality of databases of ID number and physical address. Then, the databases is integrated and divided again according to the topology of the network, so as to ensure that the databases of the ID number and physical address match the network topology managed by the microgrid local servers, thereby enabling new databases of the ID numbers and physical addresses to be introduced into a corresponding microgrid local server. If the ID number of the photovoltaic power generation node is not introduced into the corresponding microgrid local server, the photovoltaic power generation node cannot join the network.

In addition, after on-site installation of all photovoltaic power generation nodes is completed, the programs on the central server and the local server program are ran. The central server 1100 may be installed with a professional server program for collecting, processing, analyzing and storing data from all of the microgrid local servers 220 and the inverter local servers 500, and use a database for data management so as to permanently store the data in a super large-scale disk of the central server. The microgrid local server 200 and the inverter local server 500 are also installed with professional software. When the microgrid local server 200 and the inverter local server 500 is powered on to operate, first the CC2530 module 230 is started to receive data information from the photovoltaic power generation nodes 100 and transmit the received data to the ARM processor 210 in serial communication. The ARM processor 210 checks the introduced ID number table after receiving the data, if the received data is the status parameter of the photovoltaic power generation node of the ID number which is included in the ID number table and thus needs to be stored, stores the data, and if the ID number in the received data is not included in the ID number table stored in the memory, discards the data.

Similarly, the central server may also obtain status parameter of each inverter 400 from the inverter local servers 500.

Step 806, reading status parameter of each photovoltaic power generation node from the central server through a terminal, so as to query the real time status and historical parameters.

Specifically, corresponding software may be ran on the mobile terminal 1400 and/or the PC terminal 1200, so as to read system data from the central server 1000. The operating status of the information-based photovoltaic power generation system may be checked through the software on the terminal.

For example, the PC terminal 1200 is a desktop, a portable computer and an industrial personal computer that is connected to the Internet in a wired or wireless manner, and is installed with professional PC terminal software. After the software is started, the PC terminal 1200 may download data of the whole photovoltaic power generation system from the central server 1100 through the Internet, the data including voltage, current, temperature and humidity, and light intensity of each photovoltaic power generation node 100, voltage and current at the DC side and the AC side of the inverter, conversion efficiency, AC side power quality factor, temperature, humidity and noise inside the inverter box, the system total power generation and other parameters. In the software on the PC terminal, according to the network topology, the photovoltaic power generation array is divided into several areas, each area including all photovoltaic power generation nodes managed by a microgrid local server. When a user clicks on a photovoltaic power generation node icon, a dialog window may display the current feature parameters of the node, as well as other information such as the physical address.

For another example, the mobile terminal 1400 may be a mobile phone, a PAD and a portable computer that communicates via a 3G network, and is equipped with professional mobile terminal software. The mobile terminal 1400 may, after the software is stated, download partial data of the photovoltaic power generation system from the central server 1100 through a 3G base station 1300 connected to the Internet, the data including voltage and current of each photovoltaic power generation node 100, voltage and current at the DC side and the AC side of the inverter, conversion efficiency, the system total power generation and other parameters. In the mobile terminal software, the network topology is also maintained. When a node icon is clicked, a dialogue window may show the current feature parameters of the node and information such as the physical address.

Similarly, the central server may also transmit the status parameter of each inverter to a particular terminal through the Internet.

Step 807, when a malfunction occurs in a particular photovoltaic power generation node, retrieving, based on the ID number of the photovoltaic power generation node, the corresponding physical address.

Specifically, if a photovoltaic power generation node is working abnormally, the software on the terminal connected to the central server may conduct marking and prompt. When clicking on the icon of the malfunctioned photovoltaic power generation node, the information of the malfunction and the physical address of the malfunctioned photovoltaic power generation node would be provided.

For example, when a malfunction occurs in a photovoltaic power generation node in the system, the icon representing the photovoltaic power generation node and the icon representing the area at which the node is located may be displayed by a different color and also blink to prompt. When the node icon is clicked, a dialog window will prompt the physical address of the malfunctioned node. The operator records the address and confirms that he or she has checked the malfunctioned node, and on site inputs the time required for the repair. The malfunction blinking prompt may be stopped during the repair period. But the icon of the node is still in a color indicating that the malfunction is not eliminated. When the malfunction is eliminated, the node icon automatically recovers the normal color. If the repair period expires, yet the malfunction is not effectively eliminated, the malfunction information on the malfunctioned node will be prompted again. Usually, the permission of the mobile terminal may be limited. For example, the mobile terminal may check the malfunction information and the physical address of the currently malfunctioned node, but is not permitted to set the malfunction repair period and malfunction elimination.

Similarly, the central server may, when finding that the inverter has a malfunction, transmit a message to a particular terminal indicating that the inverter malfunctions.

Step 808, the on-site operator finding, according to the physical address, the malfunctioned photovoltaic power generation node, and eliminating the malfunction according to the malfunction prompt.

The node malfunction status may include abnormality in the output voltage and current parameters of the solar cell module 110 and environmental parameters such as the temperature and humidity and the illumination, etc., or may be operation abnormalities of other circuits of the photovoltaic power generation node. The node may be replaced on the site or go through depot repair. Malfunctioned inverters may be treated with similarly.

Step 809, after the malfunction is eliminated, the terminal may eliminate the malfunction prompt message through the management software, and then the system recovers.

The present disclosure can not only conduct real-time monitor for the operating status of the photovoltaic power generation system, but also inspect common malfunction status and assist to eliminate the malfunction by accurate positioning, which is of great significance for improving management and informationization of conventional photovoltaic power plant and has the value in application in the field of photovoltaic power generation application and related electric power industry.

One skilled in the art would appreciate that each exemplary elements and algorithm steps in the embodiments described herein can be implemented by electronic hardware, or electronic hardware in combination with computer software. Whether these functions are implemented in hardware or software depends on the specific application and design constraints of the technical solution. One skilled in the art may select different methods for a particular application to implement the described functionality. But such implementation should not be considered beyond the scope of the present disclosure.

If the functionality is implemented in the form of computer software and sold or used as an independent product, it is considered, to some extent, all or a part of the technical solution of the present disclosure (for example, the part contributing to the prior art) is presented in form of computer software product. The computer software product is typically stored in a computer-readable non-volatile storage medium, including several instructions for enabling a computer device (which may be a personal computer, a server, or a network device, etc.) to perform all or a part of the steps of the methods in the embodiments of the present disclosure. The foresaid storage medium includes a variety of mediums capable of storing program codes, such as a USB disk, a mobile hard disk, a read-only memory (ROM), a random access memory (RAM), a magnetic disk, or an optical disk.

It will be appreciated that the inventive concept is not limited to the exact construction that has been described above and illustrated in the accompanying drawings, and that various modifications and changes can be made without departing from the scope of the present disclosure. It is intended that the scope of the disclosure only be limited by the appended claims.

What is claimed is:

1. A photovoltaic power generation system, comprising at least one photovoltaic power generation microgrid and a central server configured to communicate with the photovoltaic power generation microgrid via Internet, the photovoltaic power generation microgrid comprising:
   a plurality of photovoltaic power generation nodes, each comprising a photovoltaic power generation module configured to convert solar energy into electrical power, a sensor module configured to collect a status parameter of the photovoltaic power generation node, and a wireless communication module configured to wirelessly transmit the status parameter of the photovoltaic power generation node, wherein the photovoltaic power generation node outputs DC power; and
   a microgrid local server configured to receive the status parameter of each of the photovoltaic power generation nodes, determine, based on the received status parameter of each of the photovoltaic power generation nodes, an operating status of the photovoltaic power generation node, and transmit the received status parameter and the determined operating status to the central server through the Internet,
   wherein, the photovoltaic power generation system further comprises a memory and a positioning assisting terminal,
   the memory is configured to store a physical address and an ID number of each of the photovoltaic power generation nodes in a correlated manner,
   the microgrid local server is configured to, when determining that a malfunction occurs in a particular photovoltaic power generation node based on the received status parameter of the photovoltaic power generation nodes, retrieve from the memory a corresponding physical address based on the ID number of the particular photovoltaic power generation node, and transmit a message indicating that the malfunction occurs in the photovoltaic power generation node with the physical address to a particular terminal via the central server, and
   the positioning assisting terminal is configured to determine a physical address at which a photovoltaic power generation node is to be installed, obtain an ID number of the photovoltaic power generation node to be installed at the physical address, and, after storing the physical address and the ID number in a correlated manner in the memory, prompt an operator to install the photovoltaic power generation node at the physical address.

2. The photovoltaic power generation system according to claim 1, further comprising:
   at least one inverter, each comprising a DC-AC conversion module configured to convert DC power output by at least one of the photovoltaic power generation nodes into AC power, a sensor module configured to collect a status parameter of the inverter, and a wireless communication module configured to wirelessly transmit the status parameter of the inverter; and
   an inverter local server configured to receive the status parameter of the inverter, and transmit the received status parameter of the inverter to the central server through the Internet.

3. The photovoltaic power generation system according to claim 2, wherein the sensor module in the inverter comprises at least one of:
   a current transformer configured to collect current parameter of the inverter;
   a voltage transformer configured to collect voltage parameter of the inverter;

a temperature and humidity sensor configured to collect temperature and humidity parameters of the inverter; and a noise sensor configured to collect ambient noise parameter of the inverter.

4. The photovoltaic power generation system according to claim 1, wherein the sensor module in each of the photovoltaic power generation nodes comprises at least one of:

a voltage sampling circuit configured to collect voltage parameter of the photovoltaic power generation module;

a current sampling circuit configured to collect current parameter of the photovoltaic power generation module;

a temperature and humidity sensor configured to collect temperature and humidity parameters of the photovoltaic power generation module; and a light intensity sensor configured to collect light intensity parameter of the environment where the photovoltaic power generation module is installed.

5. A malfunction detection method for the photovoltaic power generation system according to claim 1, the method comprising:

determining by the microgrid local server based on the received status parameter of each of the photovoltaic power generation nodes, an operating status of the photovoltaic power generation node; and when determining that a malfunction occurs in a particular photovoltaic power generation node, retrieving by the microgrid local server based on an ID number of the particular photovoltaic power generation node, a corresponding physical address, and transmitting by the microgrid local server a message indicating that the malfunction occurs in the photovoltaic power generation node with the physical address to a particular terminal via the central server.

6. The malfunction detection method according to claim 5, further comprising a step of storing a physical address and an ID number of each of the photovoltaic power generation nodes in a correlated manner.

7. The malfunction detection method according to claim 6, wherein the step of storing the physical address and the ID number of each of the photovoltaic power generation nodes in a correlated manner comprises:

determining a physical address at which a photovoltaic power generation node is to be installed;

obtaining an ID number of the photovoltaic power generation node to be installed at the physical address; and after the physical address and the ID number are stored in a correlated manner, prompting an operator to install the photovoltaic power generation node at the physical address.

* * * * *